US012748917B2

(12) United States Patent
Su et al.

(10) Patent No.: US 12,748,917 B2
(45) Date of Patent: Sep. 29, 2026

(54) SYSTEMS AND METHODS FOR LARGE LANGUAGE MODEL BASED DEVICE AND NETWORK MANAGEMENT AND AUTOMATION

(71) Applicant: Verizon Patent and Licensing Inc., Basking Ridge, NJ (US)

(72) Inventors: Le Su, Edison, NJ (US); Stephen P. Kaputsos, Ellicott City, MD (US); Yiming Chen, Millburn, NJ (US); Wenyuan Lu, Raritan, NJ (US); Yu Wan, Edgewater, NJ (US); Michael P. Ruffini, Methuen, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 160 days.

(21) Appl. No.: 18/622,149

(22) Filed: Mar. 29, 2024

(65) Prior Publication Data

US 2025/0307542 A1 Oct. 2, 2025

(51) Int. Cl.
*G06F 40/20* (2020.01)

(52) U.S. Cl.
CPC .................................... *G06F 40/20* (2020.01)

(58) Field of Classification Search
CPC ........................................................ G06F 40/20
See application file for complete search history.

(56) References Cited

U.S. PATENT DOCUMENTS

| | | | | |
|---|---|---|---|---|
| 12,164,959 | B2 * | 12/2024 | Youn | G06F 9/5066 |
| 12,314,300 | B1 * | 5/2025 | Sharma | G06F 16/3347 |
| 2022/0107839 | A1 * | 4/2022 | Youn | G06N 3/045 |
| 2024/0419988 | A1 * | 12/2024 | Su | G06N 5/04 |
| 2025/0028759 | A1 * | 1/2025 | Castillo | G06F 16/838 |
| 2025/0117698 | A1 * | 4/2025 | Joynt | G06N 20/00 |
| 2025/0148477 | A1 * | 5/2025 | Mehrotra | G06Q 10/20 |
| 2025/0272513 | A1 * | 8/2025 | Deutsch | G06F 40/40 |
| 2025/0272604 | A1 * | 8/2025 | Coutinho | G06N 20/00 |

* cited by examiner

*Primary Examiner* — Sonia L Gay

(57) ABSTRACT

A device may receive a query, and may generate an embedding based on the query. The device may determine context for the query based on the embedding and historical data, and may select, based on the context, a base LLM from a plurality of base LLMs. The device may fine-tune the base LLM with LLM fine-tuning data to generate a fine-tuned LLM, and may process the embedding, with the fine-tuned LLM, to identify tasks associated with the query. The device may determine recommended tasks based on the tasks, and may select a task LLM from a plurality of task LLMs. The device may process the tasks and the recommended tasks, with the task LLM, to determine final tasks, and may cause the final tasks to be executed. The device may perform one or more actions based on the final tasks.

20 Claims, 16 Drawing Sheets

SYSTEMS AND METHODS FOR LARGE LANGUAGE MODEL BASED DEVICE AND NETWORK MANAGEMENT AND AUTOMATION

BACKGROUND

As demands for cellular networks increase with advancing technologies in various sectors, the need for increased efficiency and network capabilities grows. Network coverage, capacity, and quality of service (QOS) in response to changing network conditions and user demands are notable factors of such demands.

DETAILED DESCRIPTION OF EXAMPLE EMBODIMENTS

Figure 1A:
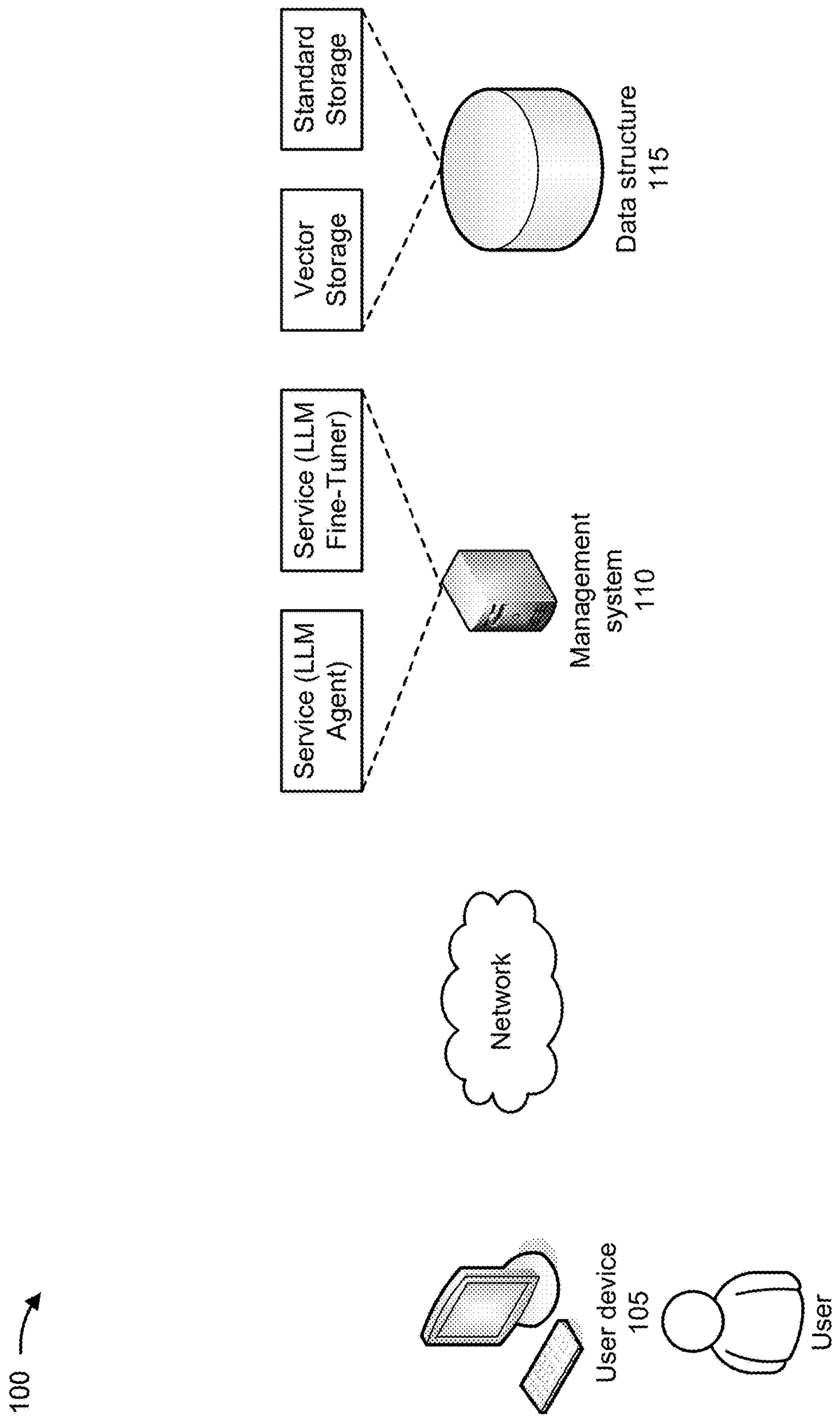
FIGS. 1A-1M are diagrams of an example associated with large language model (LLM) based device and network management and automation.

The following detailed description of example implementations refers to the accompanying drawings. The same reference numbers in different drawings may identify the same or similar elements.

Currently, tasks of network administrators and engineers, such as network monitoring, troubleshooting, maintenance, and analysis, may be performed to determine network performance and capability. However, in order to satisfy the demands of new technologies and use cases, such tasks may need to be enhanced and cellular networks must ultimately become more intelligent, proactive, and responsive. Additionally, new functionalities are required so that relevant information is available in a timely manner.

Large language models (LLMs) may be utilized to address growing network demands and establish a more intelligent, proactive, and responsive cellular network. LLMs are changing the world of human-machine interaction, but domain customization of LLMs may be required to make the LLMs suitable for use cases associated with domain knowledge and/or a development environment. Frequently the LLMs need to be customized (e.g., fine-tuned) for data privacy, security, and regulatory compliance. However, commercially-available or base LLMs are not designed to solve specific domain problems, and training (e.g., fine-tuning) the base LLMs from scratch requires additional time, cost, and staff. Furthermore, training data requires additional processing and even redesign in order to be useful for fine-tuning the base LLMs. The base LLMs are unable to determine which agent tools to utilize and fail to personalize context to users. The base LLMs fail to advance knowledge and/or task ability through continuous usage.

Thus, current techniques for utilizing LLMs to manage networks (e.g., cellular networks) consume computing resources (e.g., processing resources, memory resources, communication resources, and/or the like), networking resources, and/or other resources associated with failing to provide correct network solutions from base LLMs, training the base LLMs with domain knowledge associated with networks, processing the domain knowledge prior to training the base LLMs, failing to determine which agent tools to utilize for the base LLMs, and/or the like.

Some implementations described herein provide a management system that provides LLM-based device and network management and automation. For example, the management system may become more autonomous over time with respect to task performance (e.g., referred to herein as "scaffolded automation"). The management system may become more autonomous based on the integration of user-type LLMs, task breakdown LLMs, and aggregate fine-tuning of LLMs. Initially, the management system may start at no autonomy and may ultimately progress towards fully automated and autonomous for task performance as task structure definitions are further developed LLMs efficiency and effectiveness are improved through task-targeted fine-tuning. The tasks may include network device optimization, base station reconfiguration, network cell monitoring, and/or the like. In terms of user experience, the management system may become more personalized to individual users over time. The management system may learn phrasing patterns and language tendencies of users over time so that the management system may produce responses that are more personalized for the user. Personalized responses may reduce communication errors between the user and the management system, and may improve the efficiency of use of the management system as well as data collection for fine-tuning purposes.

In this way, the management system provides LLM-based device and network management and automation. For example, the management system may enhance efficiency of task performance and network automation for users based on fine-tuned LLMs. The management system may automate the fine-tuning process of the LLMs, and may utilize user-type-specific and task-specific LLMs. The management system may determine a user's type (e.g., technician, engineer, manager, and/or the like) and may match the user with an appropriate LLM designed for specific user types to ensure that responses from the LLM are relevant to the user's context and tasks. The management system may continually advance knowledge and task performance capabilities of LLMs through usage by maintaining a user interaction log library, optimizing task instructions, and continuously updating the LLMs based on user interactions. Thus, the management system may conserve computing resources, networking resources, and/or other resources that would have otherwise been consumed by failing to provide correct network solutions from base LLMs, training the base LLMs with domain knowledge associated with networks, processing the domain knowledge prior to training the base LLMs, failing to determine which agent tools to utilize for the base LLMs, and/or the like.

FIGS. 1A-1M are diagrams of an example 100 associated with LLM-based device and network management and automation. As shown in FIGS. 1A-1M, example 100 includes a user device 105 associated with a user, a management system 110, and a data structure 115. Further details of the user device 105, the management system 110, and the data structure 115 are provided elsewhere herein.

As shown in FIG. 1A, the management system 110 and the data structure 115 may include a service (e.g., an LLM agent), another service (e.g., an LLM fine-tuner), a vector storage (e.g., a data structure), and a standard storage (e.g., a data structure). In the context of LLMs, a combination of an LLM and an LLM toolset or tools may be referred to as an agent. The management system 110 may include an LLM agent with a User Type subagent and a Network Task subagent. An LLM toolset is a set of additional functions and external software at the disposal of an LLM. The LLM toolset may be triggered and have input sent from an active LLM, and output received as well. For example, an LLM toolset may include a calculator or a web search application that the LLM can interact with in order to perform the tasks of math calculations or a search for content online. Fine-tuning of LLMs may adjust model parameters using domain-specific data to improve performance on targeted tasks. A dataset may be utilized to fine-tune an LLM. The structure and content of the dataset may be specific to particular uses and tasks targeted for improving performance.

Figure 1B:
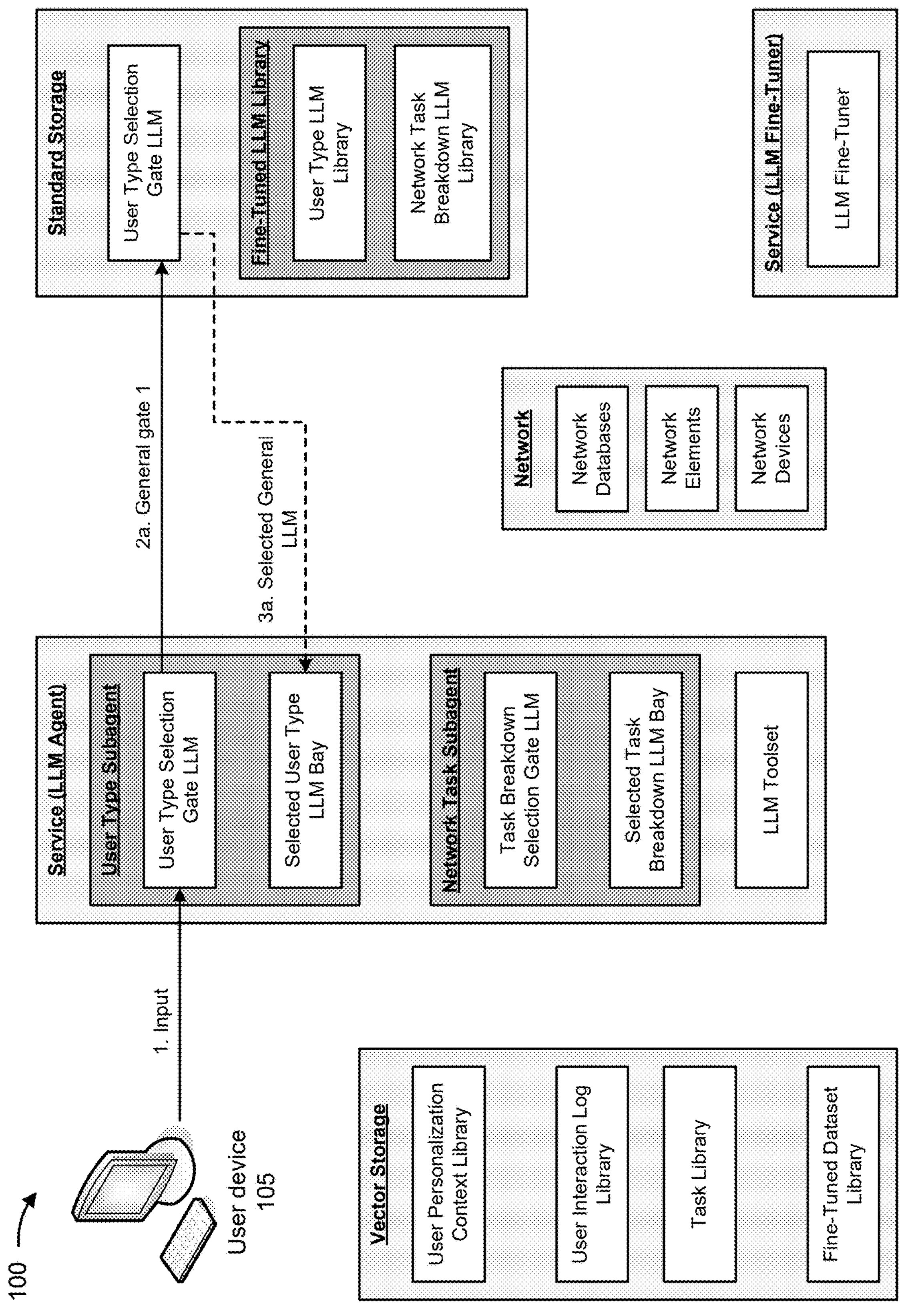

As shown in FIG. 1B, the management system 110 and/or the data structure 115 may include the vector storage, the service (e.g., the LLM agent), the standard storage, and the other service (e.g., the LLM fine-tuner), which are associated with the network. The vector storage may include a user personalization context library, a user interaction log library, a task library, and a fine-tuned dataset library. The LLM agent may include a user type subagent, a network task subagent, and an LLM toolset. The user type subagent may include a user type selection gate LLM and a selected user type LLM bay. The network task subagent may include a task breakdown selection gate LLM and a selected task breakdown LLM bay. The standard storage may include a user type selection gate LLM and a fine-tuned LLM library with a user type LLM library and a network task breakdown LLM library. The LLM fine-tuner may include an LLM fine-tuner. The network may include network databases, network elements, network devices, and/or the like.

User types may refer to a particular position or a role that the user has in an organization. For example, the role of a router technician may be a user type. All users of the management system 110 may have a login account that contains their user types, which is provided to the management system 110 upon login. The user types may be provided for scaffolded automation since the user types enable tasks to be grouped and related based on standard responsibilities of a user type.

A user type LLM may represent an understanding of general domain knowledge associated with a particular user role/position by the management system 110. A user type LLM may be a fine-tuned LLM that is specialized for answering questions and providing information relevant to a particular user type. User type LLMs may interface with task breakdown LLMs when task-relevant knowledge or task execution is required by the user. User type LLMs may be loaded into the management system 110 by system administrators and/or maintainers.

A task breakdown LLM may represent an understanding of a given task's structure and a means of execution by the management system 110. A task breakdown LLM may be a fine-tuned LLM that is specialized for completing a particular task and handling any logic for determining a proper sequencing of subtasks. In some cases, multiple task breakdown LLMs may be active at a time as determined by the selection gate LLM. When this occurs, the task breakdown LLMs may be refactored and updated through an aggregate fine-tuning process. Initial versions of task breakdown LLMs may be loaded into the management system 110 by system administrators and/or maintainers. The task performance of the task breakdown LLMs may be continually developed by an automated fine-tuning process (e.g., an aggregate fine-tuning process) of the management system 110, which may result in the task breakdown LLMs having fully automated task performance. The task breakdown LLMs may utilize the LLM Toolset to interface with network components so that tasks requiring these items may be performed. For example, to perform modem optimization tasks, associated task breakdown LLMs may utilize a tool for retrieving data from and sending data to a target network device.

As multiple users utilize the management system 110 to perform tasks in parallel, usage data may be analyzed to produce more data for the task breakdown LLM fine-tuning datasets. These further developed fine-tuning datasets may then be used to automatically fine-tune the task breakdown LLMs, thus improving the LLMs and ultimately task performance by the management system 110. The process of fine-tuning may be scaled up to multiple LLMs in parallel but may be automated as well.

The task library may provide the LLM fine-tuning datasets with the data needed to continually update the task breakdown LLMs (e.g., an scaffold autonomy accordingly). The task library may include optimized task instructions produced by an active set of task breakdown LLMs. Multiple LLMs may be active at a time depending on user needs or if a new combination of tasks is being presented to the task breakdown selection gate. The optimized instructions may be utilized to refactor and/or update the task breakdown LLMs so that the task breakdown LLMs are robust to a newly presented task request. The refactoring and updating may be performed by the fine-tuning process.

While the management system 110 is utilized, logs of user interactions with the user type LLM (or a base LLM if active in the selected user type LLM Bay) are processed and stored in the vector storage within the user interaction log library. Content of the user interaction log library may be separated by user and associated with a user account.

Logs from the user interaction log library may be additionally processed in the user personalization context library. Processing may be continually performed to identify input and/or language patterns of an individual user as well as to update the input and/or the language patterns over time so that the input and/or the language patterns may be simplified into additional instructions and/or background information for which the user type LLM to adhere. The instructions may be appended to a very beginning of any incoming prompts from the user (e.g., as context). By following the instructions, the user type LLMs output to the user may become personalized, thus making it easier for the user to communicate with the management system 110. This ultimately increases efficiency in the overall process of continually collecting additional data for aggregate fine-tuning as well as enhancing user experience.

As shown at step 1 of FIG. 1B, the LLM agent (e.g., the user type selection gate LLM of the user type subagent of the LLM agent) may receive an input from the user device 105. For example, the user may provide the input to the user device 105 and may cause the user device 105 to provide the input to the user type selection gate LLM of the management system 110. In some implementations, the input may include in input associated with a software development task, a network device deployment, data retrieval, troubleshooting, managing a network, and/or the like. As shown at step 2_a_, the user type selection gate LLM may provide a request for a general LLM to the user type selection gate LLM of the standard storage. The user type selection gate LLM may select a general LLM based on the request for the general LLM, and may provide the selected general LLM to the selected user type LLM bay of the user type subagent, as shown at step 3_a_.

Figure 1C:
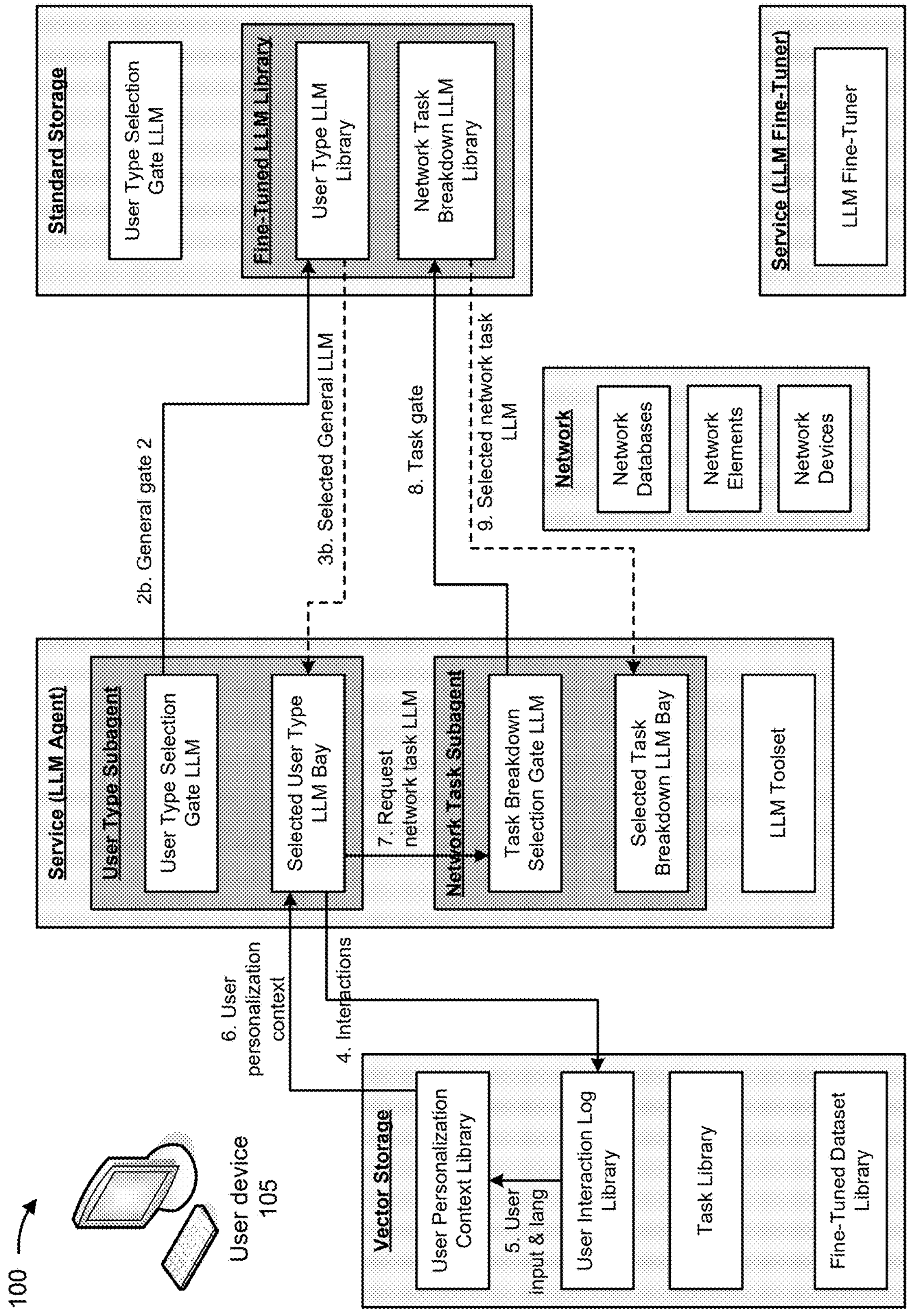

Alternatively, and as shown at step 2*b* of FIG. 1C, the user type selection gate LLM may provide a request for a general LLM to the user type LLM library of the fine-tuned LLM library of the standard storage. The user type LLM library may select a general LLM based on the request for the general LLM, and may provide the selected general LLM to the selected user type LLM bay of the user type subagent, as shown at step 3*b*. As shown at step 4, the selected user type LLM bay may provide interactions of the user to the user interaction log library of the vector storage. The user interaction log library may determine user input and language based on the interactions of the user, and may provide the user input and language to the user personalization context library of the vector storage, as shown at step 5. As shown at step 6 of FIG. 1C, the user personalization context library may identify user personalization context based on the user input and language, and may provide the user personalization context to the selected user type LLM bay of the user type subagent of the LLM agent.

As shown at step 7 of FIG. 1C, the selected user type LLM bay may generate a request for a network task LLM and may provide the request to the task breakdown selection gate LLM of the network task subagent. As shown at step 8, the task breakdown selection gate LLM may generate and provide the request for the network task LLM to the network task breakdown LLM library of the fine-tuned LLM library. As shown at step 9, the network task breakdown LLM library may select a network task LLM based on the request for the network task LLM, and may provide the selected network task LLM to the selected task breakdown LLM bay of the network task subagent.

Figure 1D:
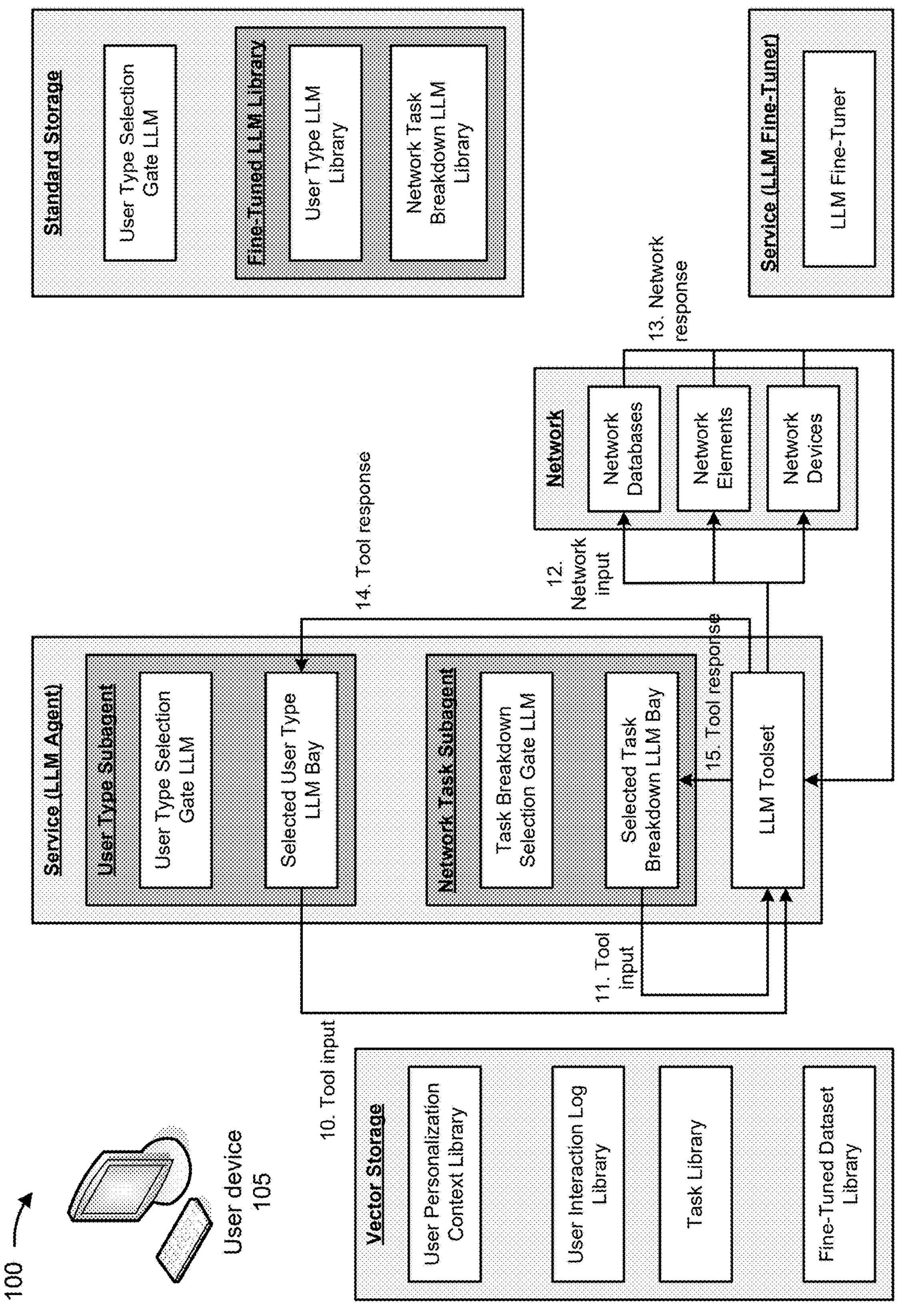

As shown at step 10 of FIG. 1D, the selected user type LLM bay may provide a tool input to the LLM toolset. As shown at step 11, the selected task breakdown LLM bay may provide another tool input to the LLM toolset. As shown at step 12, the LLM toolset may generate a request for network input, and may provide the request for the network input to the network databases, the network elements, and the network devices of the network. As shown at step 13 of FIG. 1D, the network databases, the network elements, and the network devices of the network may generate a network response to the request for the network input, and may provide the network response to the LLM toolset. As shown at step 14, the LLM toolset may generate, based on the network input, a tool response to the tool input received from the selected user type LLM bay, and may provide the tool response to the selected user type LLM bay. As shown at step 15, the LLM toolset may generate, based on the network input, another tool response to the other tool input received from the selected task breakdown LLM bay, and may provide the other tool response to the selected task breakdown LLM bay.

Figure 1E:
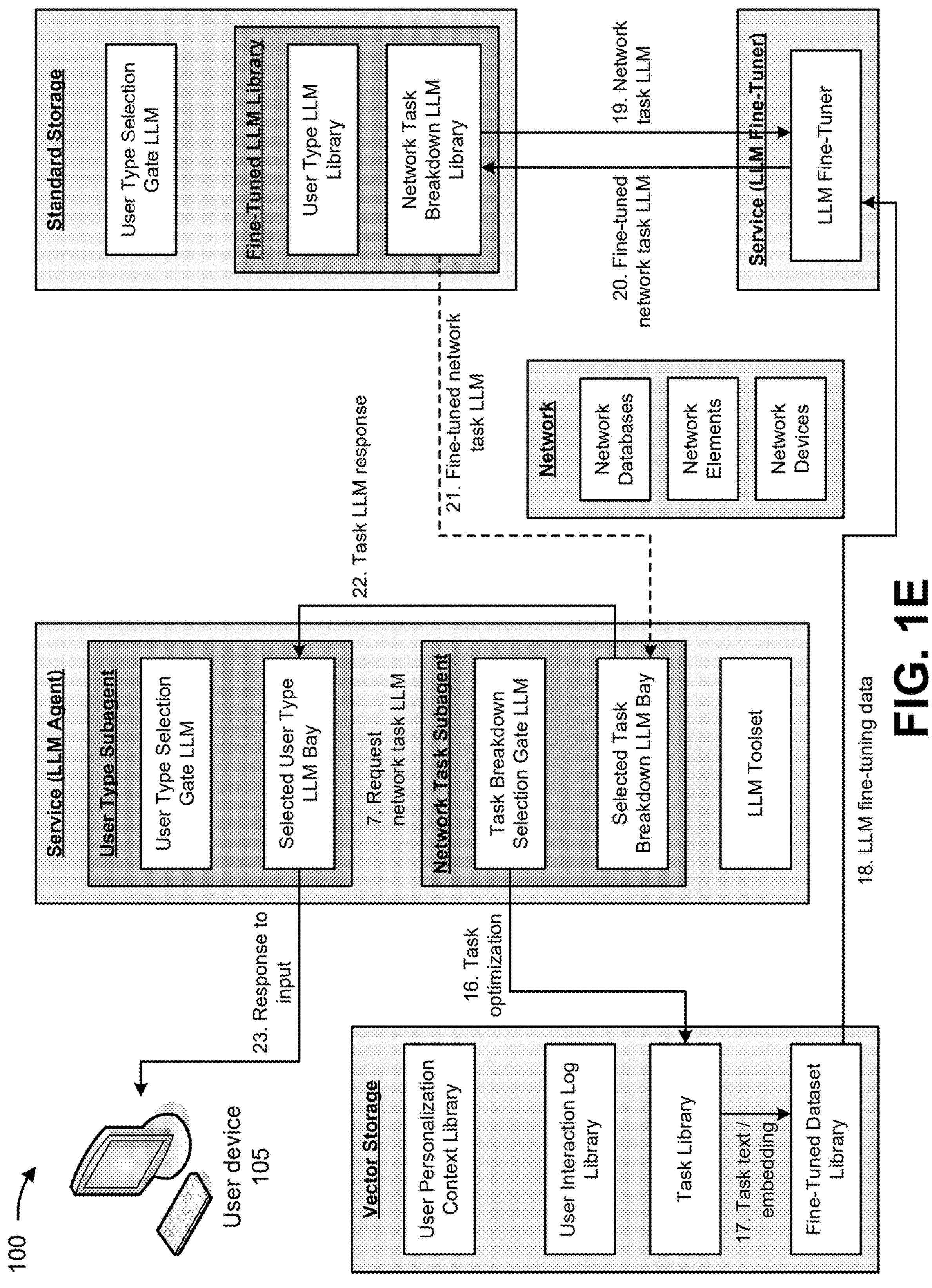

As shown at step 16 of FIG. 1E, the task breakdown selection gate LLM of the network task subagent may generate and provide a task optimization request to the task library of the vector storage. As shown at step 17, the task library may generate task text and an embedding based on the task optimization request, and may provide the task text and the embedding to the fine-tuned dataset library. As shown at step 18, the fine-tuned dataset library may generate a LLM fine-tuning data based on the task text and the embedding, and may provide the LLM fine-tuning data to the LLM fine-tuner. As shown at step 19, the LLM fine-tuner may receive the network task LLM from the network task breakdown LLM library of the standard storage. As shown at step 20, the LLM fine-tuner may fine-tune the network task LLM, with the LLM fine-tuning data, to generate a fine-tuned network task LLM, and may provide the fine-tuned network task LLM to the network task breakdown LLM library. As shown at step 21 of FIG. 1E, the network task breakdown LLM library may provide the fine-tuned network task LLM to the selected task breakdown LLM bay. As shown at step 22, the selected task breakdown LLM bay may utilize the fine-tuned network task LLM to generate a task LLM response, and may provide the task LLM response to the selected user type LLM bay. As shown at step 23, the selected user type LLM bay may generate a response to the input (e.g., received from the user device 105) based on the task LLM response, and may provide the response to the input to the user device 105.

Figure 1F:
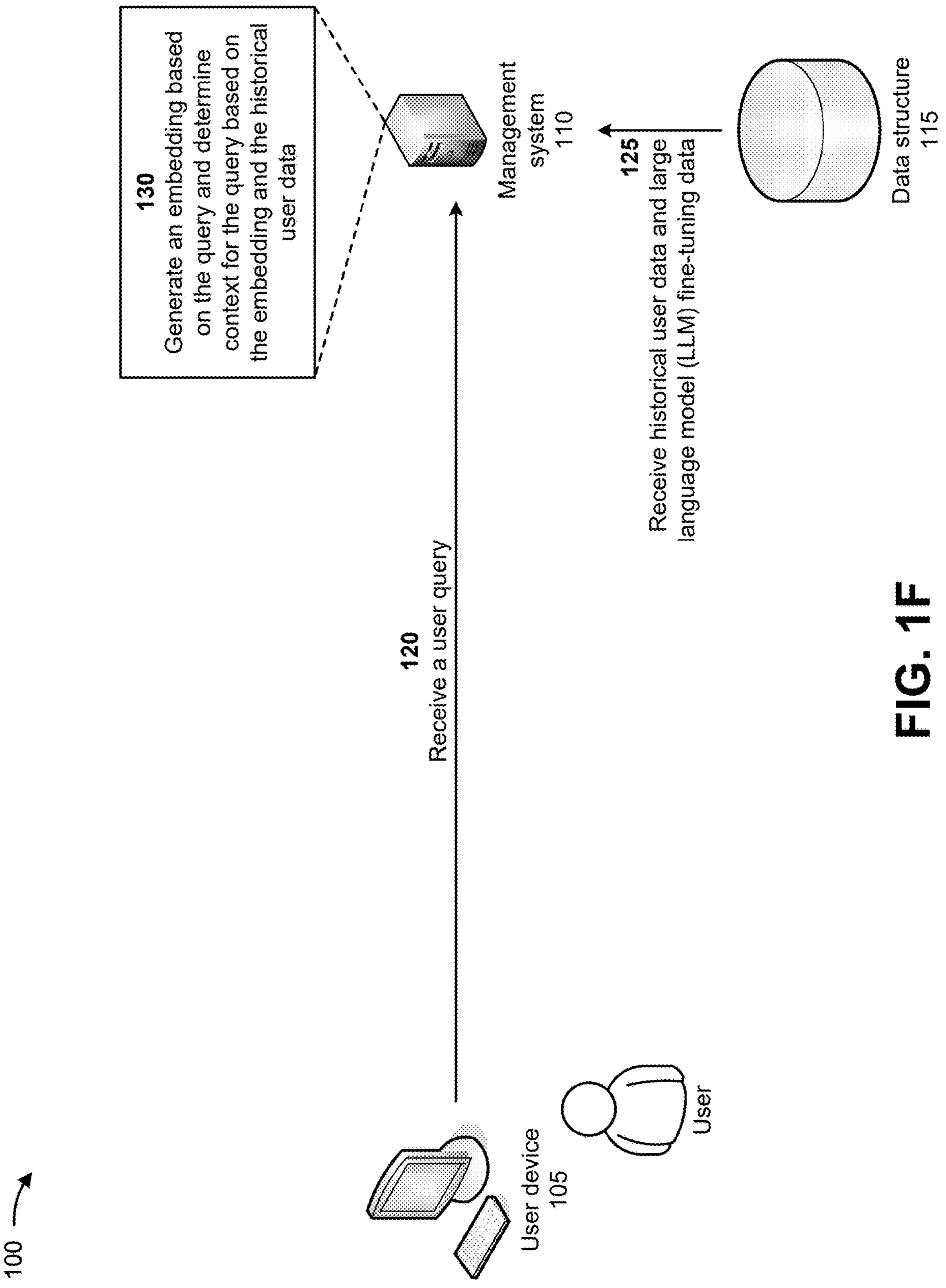

As shown in FIG. 1F, and by reference number 120, the management system 110 may receive a user query (e.g., also referred to as the query) associated with the user of the user device 105. For example, the user may provide the user query to the user device 105 and may cause the user device 105 to provide the user query to the management system 110. The management system 110 may receive the user query from the user device 105. In some implementations, the management system 110 may provide a natural language user interface to the user device 105 and the user may utilize the natural language user interface to provide the user query to the user device 105. In some implementations, the user query may include a query associated with a software development task, a network device deployment, data retrieval, troubleshooting, managing a network, and/or the like. In some implementations, the management system 110 may customize interactions with the user by appending a user personalization context to the user query. The user personalization context may align responses of the management system 110 with the user's query style, preferences, task requirements, and/or the like.

As further shown in FIG. 1F, and by reference number 125, the management system 110 may receive historical user data and LLM fine-tuning data. For example, the user may interact with the management system 110 (e.g., via the user device 105) and LLMs of the management system 110 over time, and the management system 110 may store the user interactions as the historical user data in the data structure 115. The management system 110 may utilize the historical user data to determine an optimal task breakdown LLM for the user. In some implementations, the management system 110 may identify the user based on the user query, and may utilize the identification of the user to request the historical user data from the data structure 115. The data structure 115 may provide the historical user data to the management system 110 based on the request, and the management system 110 may receive the historical user data from the data structure 115. In some implementations, the historical user data may include data identifying a type associated with the user, historical interactions of the user with the management system 110, and/or the like.

The management system 110 may fine-tune and continuously improve LLMs utilized by the user over time. The management system 110 may generate the LLM fine-tuning data based on fine-tuning and improving the LLMs utilized by the user over time. The LLM fine-tuning data may include data identifying optimized task instructions that are used to fine-tune the LLMs utilized by the user. The management system 110 may continuously fine-tune the LLMs as the user utilizes the LLMs, which may enable the management system 110 to improve performance and knowledge of the LLMs over time. This continuous improvement may enhance an ability of the management system 110 to automate tasks and provide personalized responses to users. In some implementations, the management system 110 may identify the user based on the user query, and may utilize the identification of the user to request the LLM fine-tuning data from the data structure 115. The data structure 115 may provide the LLM fine-tuning data to the management system 110 based on the request, and the management system 110 may receive the LLM fine-tuning data from the data structure 115.

As further shown in FIG. 1F, and by reference number 130, the management system 110 may generate an embedding based on the query and may determine context for the query based on the embedding and the historical user data. For example, the management system 110 may convert words of the user query into word embeddings. In natural language processing (NLP), a word embedding is a representation of a word that may be used in text analysis. In some implementations, the representation may be a real-valued vector that encodes a meaning of the word in such a way that the words that are closer in a vector space are expected to be similar in meaning. The management system 110 may generate the embedding (e.g., the word embeddings) using language modeling and feature learning techniques, where words or phrases from a vocabulary are mapped to vectors of real numbers.

In some implementations, the management system 110 may customize interactions with the user by determining the context (e.g., a user personalization context) based on the embedding (e.g., the word embeddings) generated from the user query and/or based on the historical user data. The user personalization context may align responses of the management system 110 with the user's query style, preferences, task requirements, and/or the like. This may enable the management system 110 to provide a natural language user interface to the user via the user device 105. In some implementations, the context for the user query may be associated with the historical user data, such as historical user data identifying a domain knowledge of the user, a development environment utilized by the user, a production application programming interface (API) utilized by the user, function tools utilized by the user, and/or the like. The management system 110 may match the context of the query with the historical user data based on the embedding generated for the query.

Figure 1G:
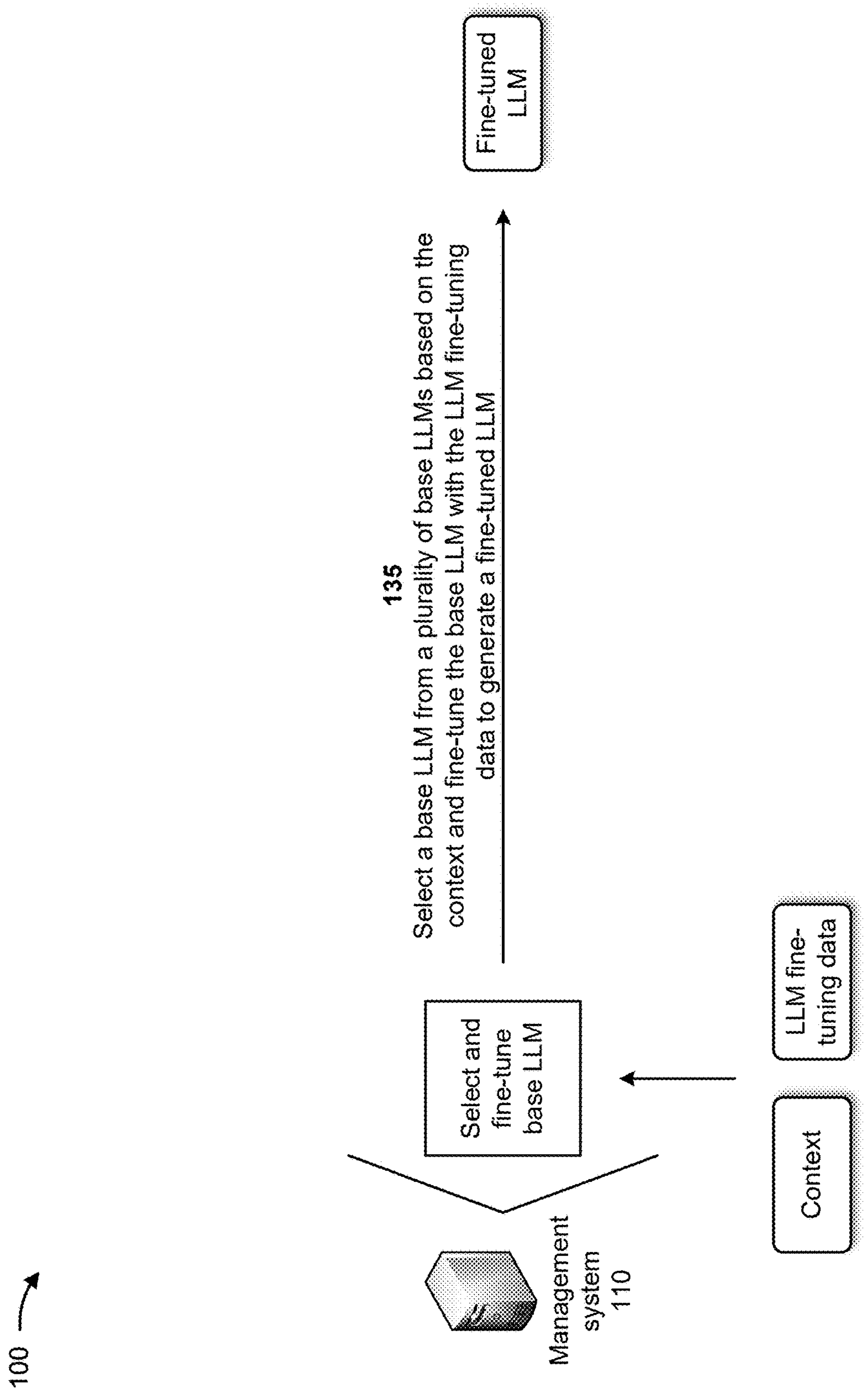

As shown in FIG. 1G, and by reference number 135, the management system 110 may select a base LLM from a plurality of base LLMs based on the context and may fine-tune the base LLM with the LLM fine-tuning data to generate a fine-tuned LLM. For example, the management system 110 may be associated with a plurality of commercially-available or base LLMs. The management system 110 may store the plurality of base LLMs in the data structure 115 and/or may access the plurality of base LLMs from a secondary source. In some implementations, the plurality of base LLMs may include general (e.g., open source) LLMs, field specific LLMs (e.g., telecommunications, networking, supply, and/or the like), software-development-related LLMs, visualizer LLMs, and/or the like. The management system 110 may select the base LLM from the general LLMs, the field specific LLMs, software development-related LLMs, visualizer LLMs, and/or the like based on the context. In some implementations, if the user query and the context requires multiple base LLMs, the management system 110 may select the multiple base LLMs from the plurality of base LLMs based on the context.

In some implementations, the management system 110 may determine whether the user query can be answered using the selected base LLM or requires a fine-tuned LLM. If the base LLM can answer the user query, the management system 110 may not fine-tune the base LLM and may utilize the base LLM. If the base LLM cannot answer the user query with a high enough probability, the management system 110 may fine-tune the base LLM with the LLM fine-tuning data to generate the fine-tuned LLM that can answer the user query. In some implementations, the management system 110 may generate a plurality of fine-tuned LLMs based on the LLM fine-tuning data prior to processing the user query. In such implementations, if the base LLM cannot answer the user query, the management system 110 may select the fined-tuned LLM from the plurality of fine-tuned LLMs.

Figure 1H:
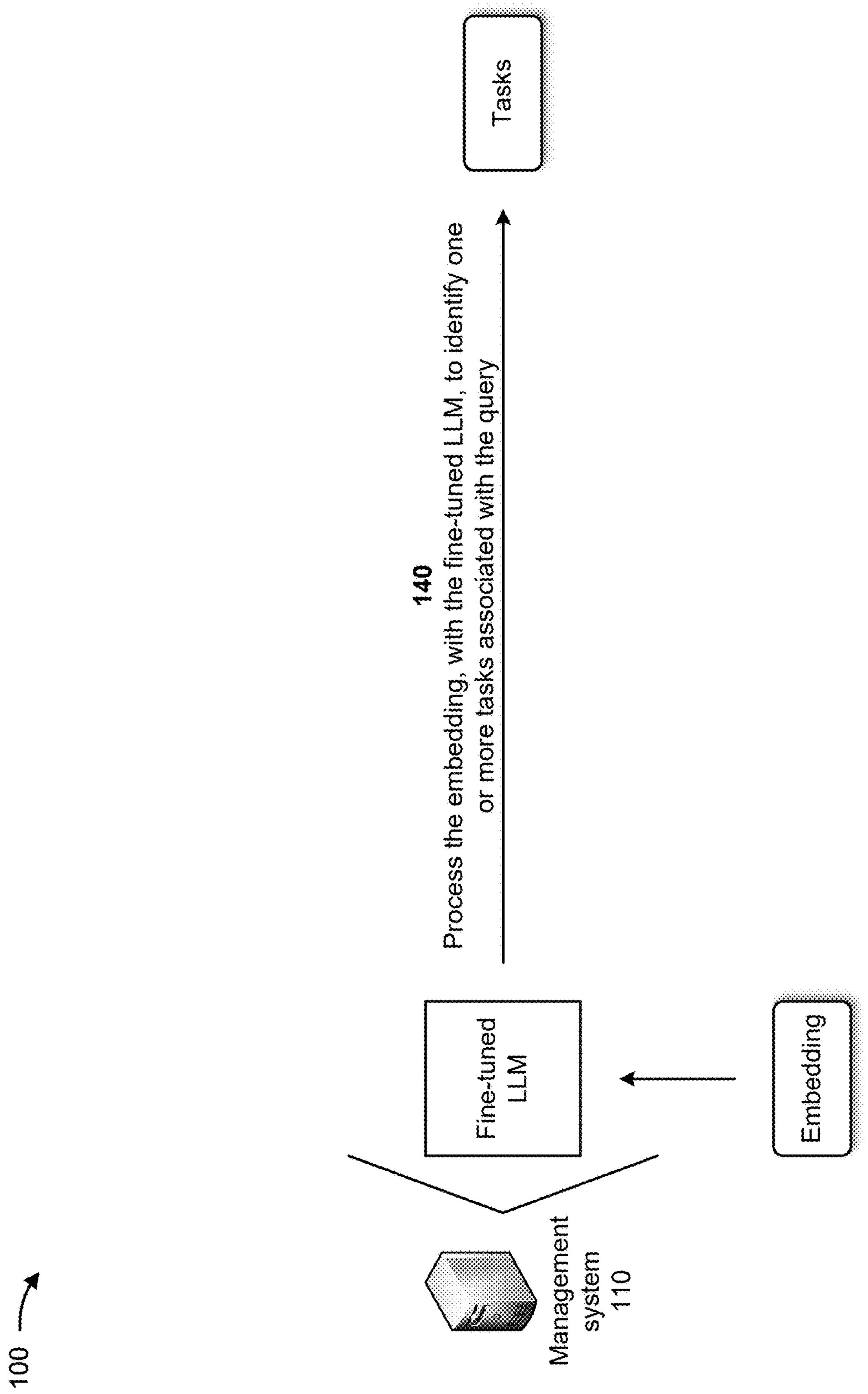

As shown in FIG. 1H, and by reference number 140, the management system 110 may process the embedding, with the fine-tuned LLM, to identify one or more tasks associated with the query. For example, the fine-tuned LLM may generate tasks to be performed based on a user query. The management system 110 may utilize the fine-tuned LLM to identify, based on the embedding, the one or more tasks associated with the query. In some implementations, the fine-tuned LLM may utilize the embedding and interactions of the user with the management system 110 to determine an optimal task breakdown (e.g., the one or more tasks) for the user. In some implementations, the one or more tasks may include tasks associated with a software development task, a network device deployment, data retrieval, troubleshooting, managing a network, and/or the like.

Figure 1I:
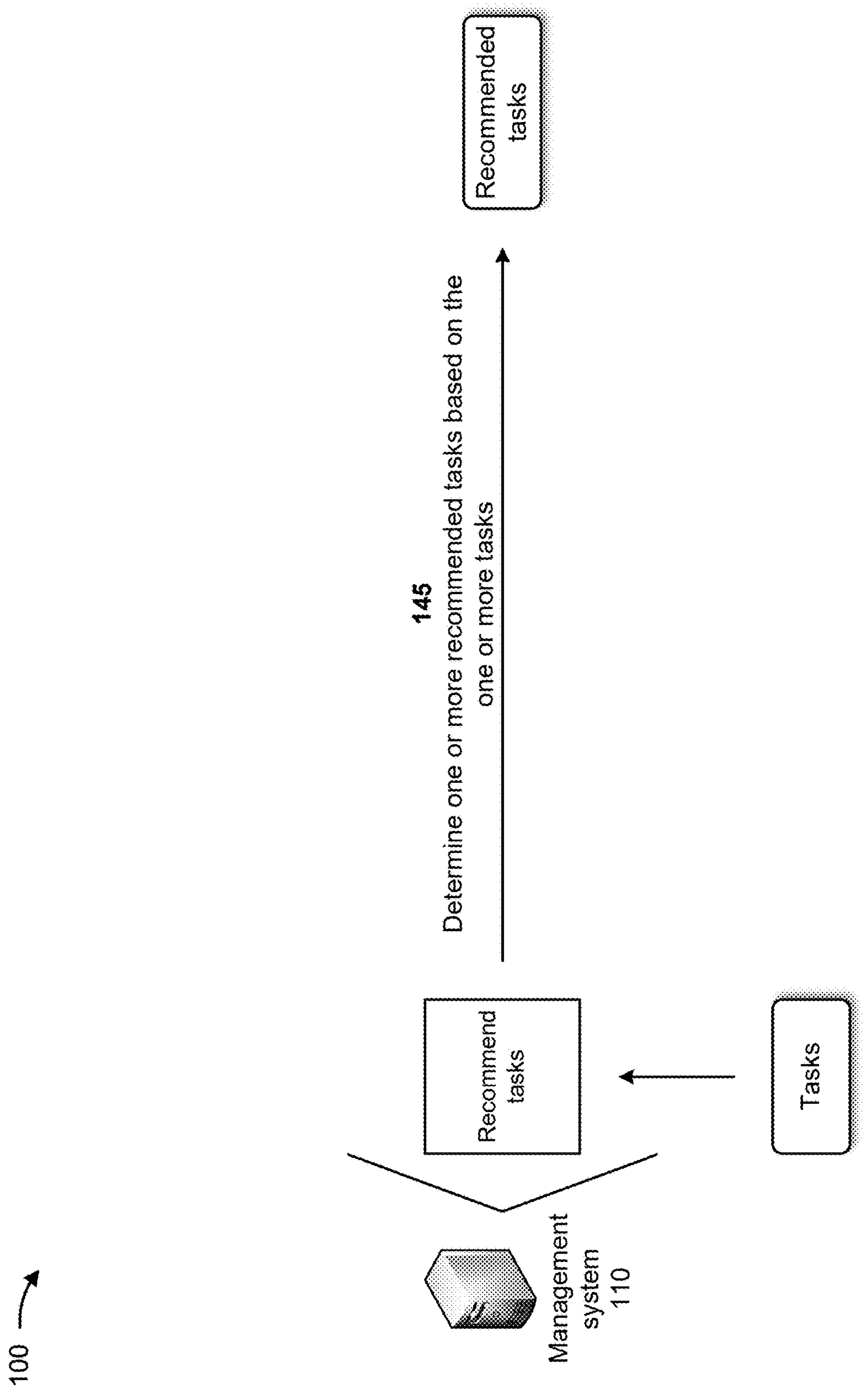

As shown in FIG. 1I, and by reference number 145, the management system 110 may determine one or more recommended tasks based on the one or more tasks. For example, the management system 110 may analyze the one or more tasks, and may generate the one or more recommended tasks based on analyzing the one or more tasks. In some implementations, the one or more recommended tasks may include tasks associated with, for example, a software development task, a network device deployment, data retrieval, troubleshooting, managing a network, and/or the like. In some implementations, the one or more recommended tasks may include a recommended new query, a recommended response to the new query, and/or the like. The management system 110 may automatically generate one or more new queries and one or more responses to the new queries for simulation purposes. This may enable the management system 110 to anticipate future queries from the user without prior direct interaction with the user, which may enhance an ability of the management system 110 to assist the user effectively.

Figure 1J:
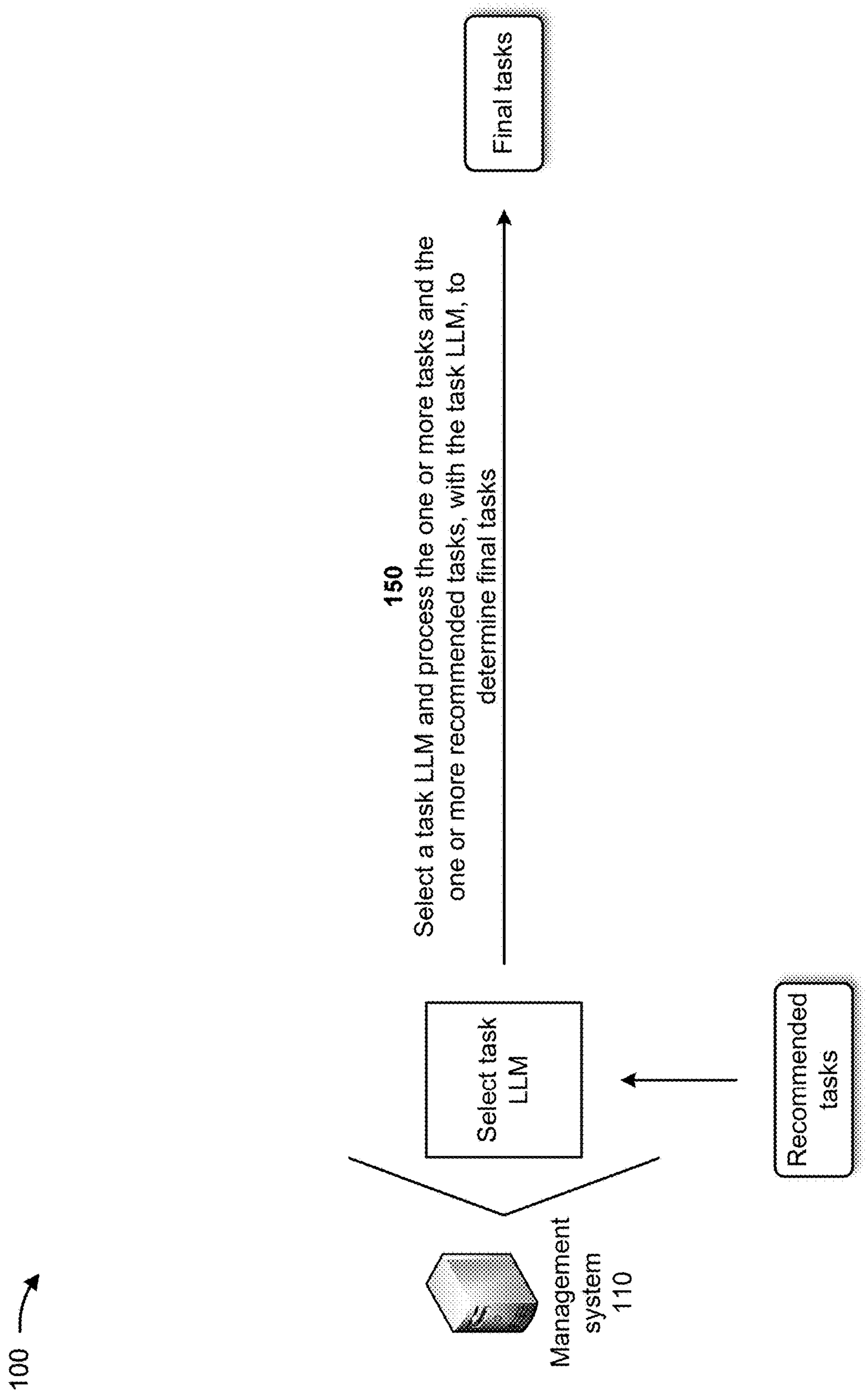

As shown in FIG. 1J, and by reference number 150, the management system 110 may select a task LLM and may process the one or more tasks and the one or more recommended tasks, with the task LLM, to determine final tasks. For example, the management system 110 may be associated with a plurality of task LLMs. The management system 110 may store the plurality of task LLMs in the data structure 115 and/or may access the plurality of task LLMs from a secondary source. In some implementations, the plurality of task LLMs may include LLMs that generate task instructions. The management system 110 may select the task LLM from the plurality of task LLMs based on user interactions with the management system 110. In some implementations, if the user query and the context require multiple task LLMs, the management system 110 may select the multiple task LLMs from the plurality of task LLMs based on the user interactions.

The management system 110 may analyze and optimize the user interactions to distill and simplify the task instructions determined by the management system 110. The management system 110 may store the task instructions in the data structure 115 and may utilize the task instructions to fine-tune the plurality of task LLMs. In this way, the management system 110 may continually improve the performance and understanding of the plurality of task LLMs. In some implementations, the final tasks may include the task instructions to be executed by the user (e.g., via the user device 105) and/or by the management system 110.

Figure 1K:
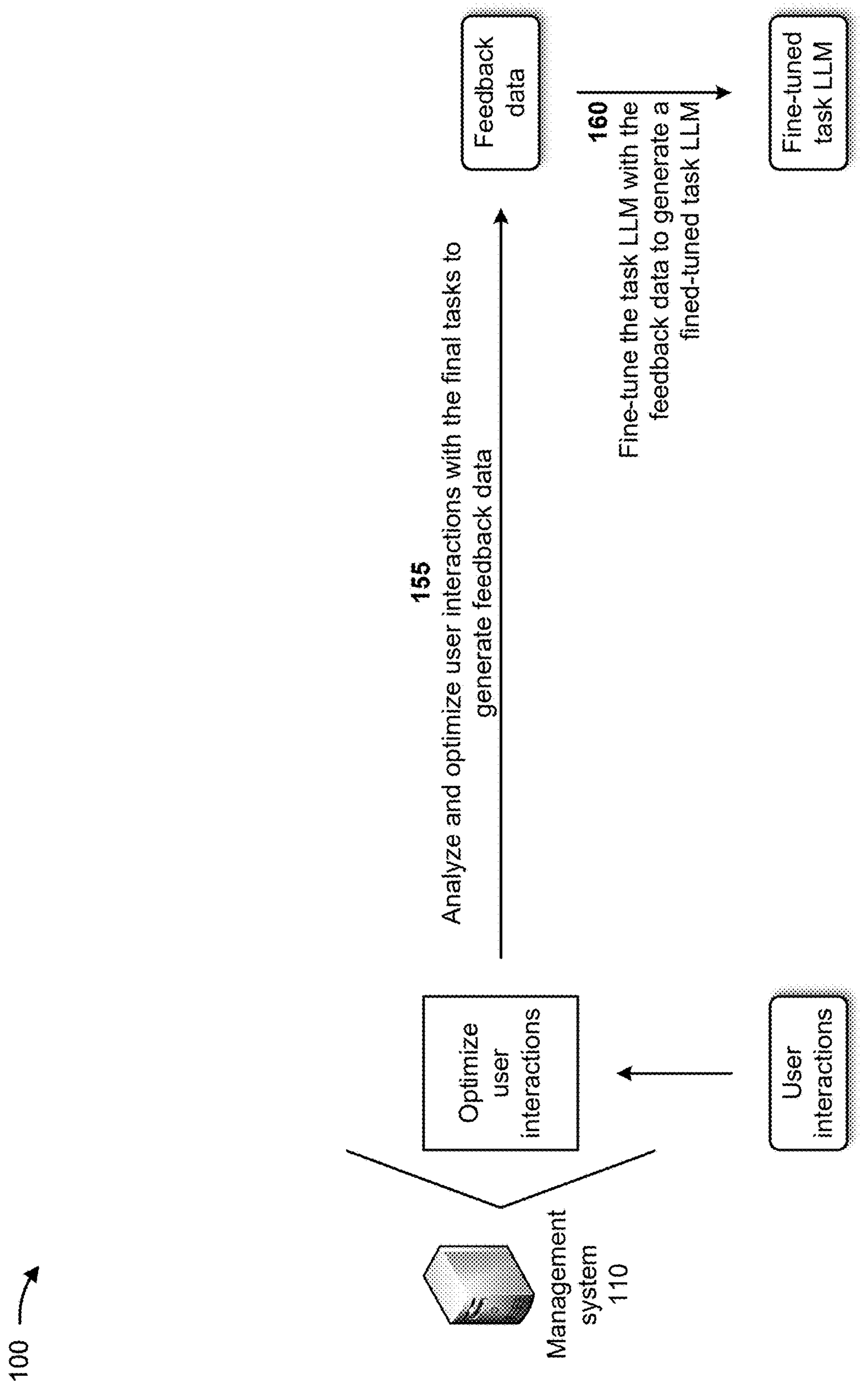

As shown in FIG. 1K, and by reference number 155, the management system 110 may analyze and optimize user interactions with the final tasks to generate feedback data. For example, the management system 110 may continually analyze the user interactions with the final tasks (e.g., did the user implement the final tasks, did the user modify the final tasks, and/or the like). The management system 110 may optimize the user interactions with the final tasks, based on analyzing the user interactions with the final tasks, to generate the feedback data. In some implementations, the feedback data may include the final tasks after being optimized based on the user interactions.

As further shown in FIG. 1K, and by reference number 160, the management system 110 may fine-tune the task LLM with the feedback data to generate a fined-tuned task LLM. For example, the management system 110 may utilize the feedback data to fine-tune the selected task LLM and continuously improve of the selected task LLM. Fine-tuning the task LLM with the feedback data may generate the fine-tuned task LLM. In some implementations, the management system 110 may continually fine-tune the task LLMs over time, which may enable the task LLMs to improve performance and knowledge over time. This continuous improvement may enable the management system 110 to automate tasks and provide personalized responses to users. In some implementations, the management system 110 may store the fine-tuned task LLM in the data structure 115 associated with the management system 110.

Figure 1L:
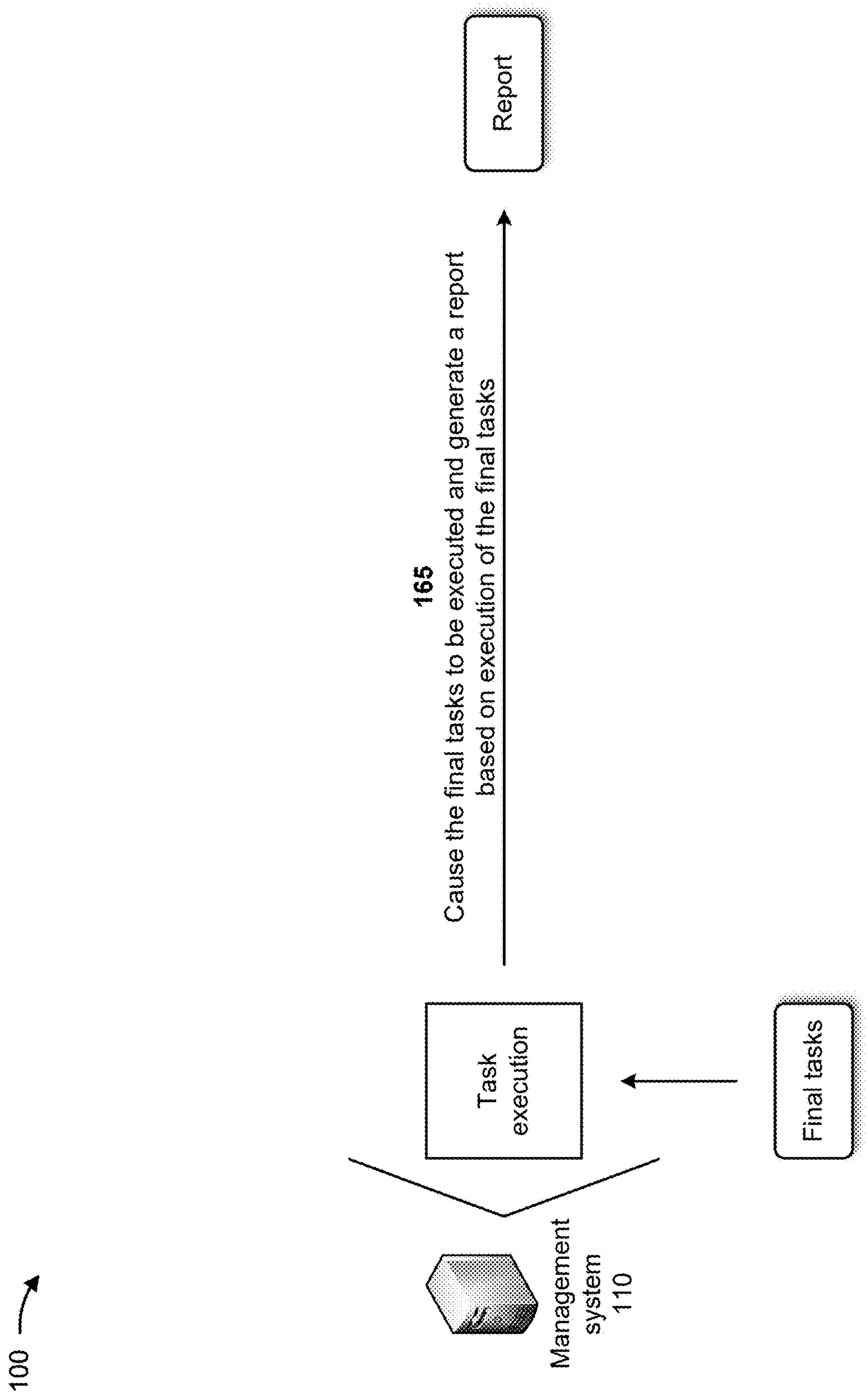

As shown in FIG. 1L, and by reference number 165, the management system 110 may cause the final tasks to be executed and may generate a report or log based on execution of the final tasks. For example, when causing the final tasks to be executed, the management system 110 may automatically execute the final tasks, may query the user for permission to execute the final tasks, or may instruct the user to execute the final tasks (e.g., via the user device 105). In some implementations, once the task LLM has been fine-tuned with the feedback data, the management system 110 may execute the final tasks automatically or based on the user's instructions. The management system 110 may generate the report and/or visualizations based on the execution of the final tasks (e.g., by the management system 110 or by the user). In some implementations, the report and/or the visualizations may provide insights and information to the user and/or to other users or systems. For example, the report may be exported and shared with various user groups, such as network administrators, engineers, and executives, to aid in decision-making and network management.

Figure 1M:
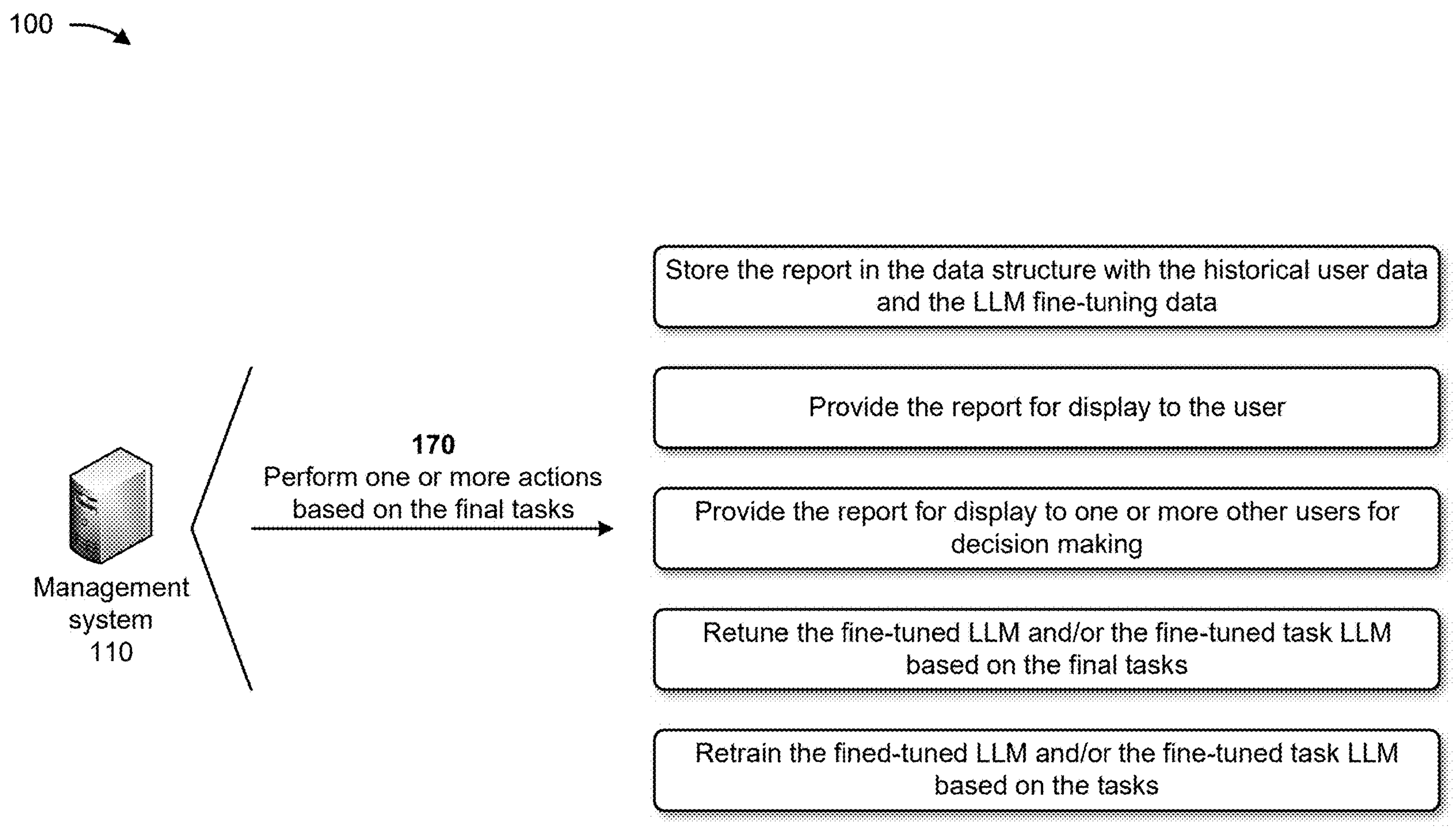

As shown in FIG. 1M, and by reference number 170, the management system 110 may perform one or more actions based on the final tasks. In some implementations, performing the one or more actions includes the management system 110 storing the report or log in the data structure 115 with the historical user data and the LLM fine-tuning data. For example, the management system 110 may store the report or log in the data structure 115 to enhance the historical user data (e.g., with user interactions identified in the report) and/or the LLM fine-tuning data (e.g., with performance results identified in the report). The enhanced historical user device and/or LLM fine-tuning data may enable the management system 110 to continuously improve outputs over time. In this way, the management system 110 conserves computing resources, networking resources, and/or other resources that would have otherwise been consumed by failing to continuously improve LLM outputs over time.

In some implementations, performing the one or more actions includes the management system 110 providing the report or log for display to the user. For example, the management system 110 may provide the report or log to the user device 105 and the user device 105 may display the report to the user. The user may utilize the report to assess the performance of the management system 110 and to provide feedback to management system 110 about the performance. In this way, the management system 110 conserves computing resources, networking resources, and/or other resources that would have otherwise been consumed by failing to properly modify LLMs based on feedback by users of the management system 110.

In some implementations, performing the one or more actions includes the management system 110 providing the report or log for display to one or more other users for decision making. For example, the management system 110 may provide the report or log to other user devices 105 associated with other users (e.g., administrators, management, and/or the like) and the other user devices 105 may display the report or log to the other users. The user may utilize the report to assess management of a network by the management system 110 and to provide feedback to management system 110 about the management. In this way, the management system 110 conserves computing resources, networking resources, and/or other resources that would have otherwise been consumed by failing to determine whether the network is being properly managed by the management system 110.

In some implementations, performing the one or more actions includes the management system 110 retuning the fine-tuned LLM and/or the fine-tuned task LLM-based on the final tasks. For example, the management system 110 may utilize the final tasks and/or results of the report or log to determine a performance of the fine-tuned LLM and/or the fine-tuned task LLM. The management system 110 may modify (e.g., fine-tune) the fine-tuned LLM and/or the fine-tuned task LLM based on the performance and may utilize the modified fine-tuned LLM and/or the modified fine-tuned task LLM in the future. In this way, the management system 110 conserves computing resources, networking resources, and/or other resources that would have otherwise been consumed by failing to improve the performance of the fine-tuned base LLMs and the fine-tuned task LLMs over time.

In some implementations, performing the one or more actions includes the management system 110 retraining the fine-tuned LLM and/or the fine-tuned task LLM-based on the final tasks. For example, the management system 110 may utilize the final tasks as additional training data for retraining the fine-tuned LLM and/or the fine-tuned task LLM, thereby increasing the quantity of training data available for training the fine-tuned LLM and/or the fine-tuned task LLM. Accordingly, the management system 110 may conserve computing resources associated with identifying, obtaining, and/or generating data for training the fine-tuned LLM and/or the fine-tuned task LLM, relative to other systems for identifying, obtaining, and/or generating historical data for training machine learning models.

In this way, the management system 110 provides LLM-based device and network management and automation. For example, the management system 110 may enhance efficiency of task performance and network automation for users based on fine-tuned LLMs. The management system 110 may automate the fine-tuning process of the LLMs, and may utilize user type-specific and task-specific LLMs. The management system 110 may determine a user's type (e.g., technician, engineer, manager, and/or the like) and may match the user with an appropriate LLM designed for specific user types to ensure that responses from the LLM are relevant to the user's context and tasks. The management system 110 may continually advance knowledge and task performance capabilities of LLMs through usage by maintaining a user interaction log library, optimizing task instructions, and continuously updating the LLMs based on user interactions. Thus, the management system 110 may conserve computing resources, networking resources, and/or other resources that would have otherwise been consumed by failing to provide correct network solutions from base LLMs, training the base LLMs with domain knowledge associated with networks, processing the domain knowledge prior to training the base LLMs, failing to determine which agent tools to utilize for the base LLMs, and/or the like.

As indicated above, FIGS. 1A-1M are provided as an example. Other examples may differ from what is described with regard to FIGS. 1A-1M. The number and arrangement of devices shown in FIGS. 1A-1M are provided as an example. In practice, there may be additional devices, fewer devices, different devices, or differently arranged devices than those shown in FIGS. 1A-1M. Furthermore, two or more devices shown in FIGS. 1A-1M may be implemented within a single device, or a single device shown in FIGS. 1A-1M may be implemented as multiple, distributed devices. Additionally, or alternatively, a set of devices (e.g., one or more devices) shown in FIGS. 1A-1M may perform one or more functions described as being performed by another set of devices shown in FIGS. 1A-1M.

Figure 2:
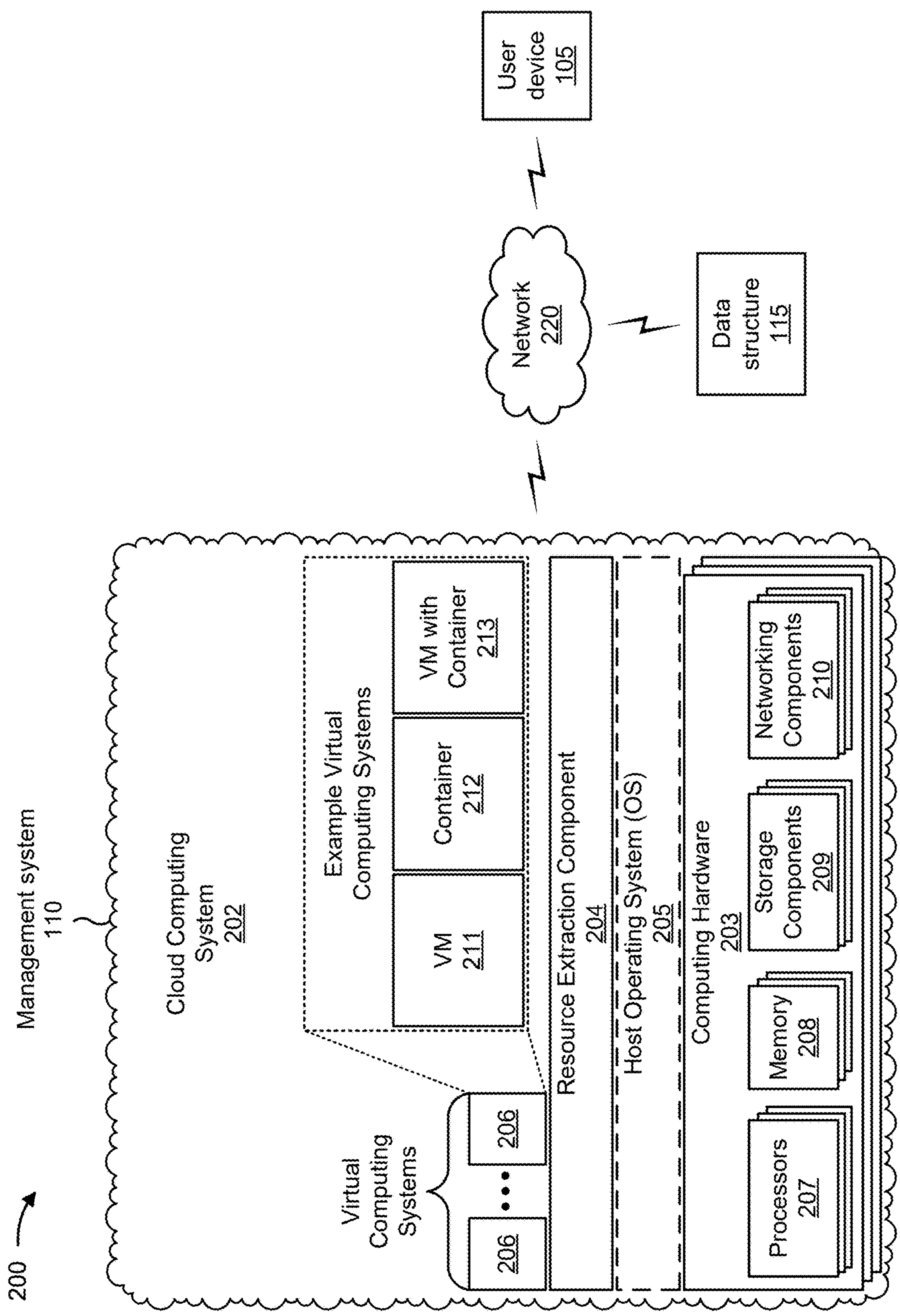
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the management system 110, which may include one or more elements of and/or may execute within a cloud computing system 202. The cloud computing system 202 may include one or more elements 203-213, as described in more detail below. As further shown in FIG. 2, the environment 200 may include the user device 105, the data structure 115, and/or a network 220. Devices and/or elements of the environment 200 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), an Internet-of-Things (IoT) device, or a similar type of device.

The data structure 115 may include one or more devices capable of receiving, generating, storing, processing, and/or providing information, as described elsewhere herein. The data structure 115 may include a communication device and/or a computing device. For example, the data structure 115 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 115 may communicate with one or more other devices of the environment 200, as described elsewhere herein.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the management system 110 may include one or more elements 203-213 of the cloud computing system 202, may execute within the cloud computing system 202, and/or may be hosted within the cloud computing system 202, in some implementations, the management system 110 may not be cloud-based (e.g., may be implemented outside of a cloud computing system) or may be partially cloud-based. For example, the management system 110 may include one or more devices that are not part of the cloud computing system 202, such as the device 300 of FIG. 3, which may include a standalone server or another type of computing device. The management system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
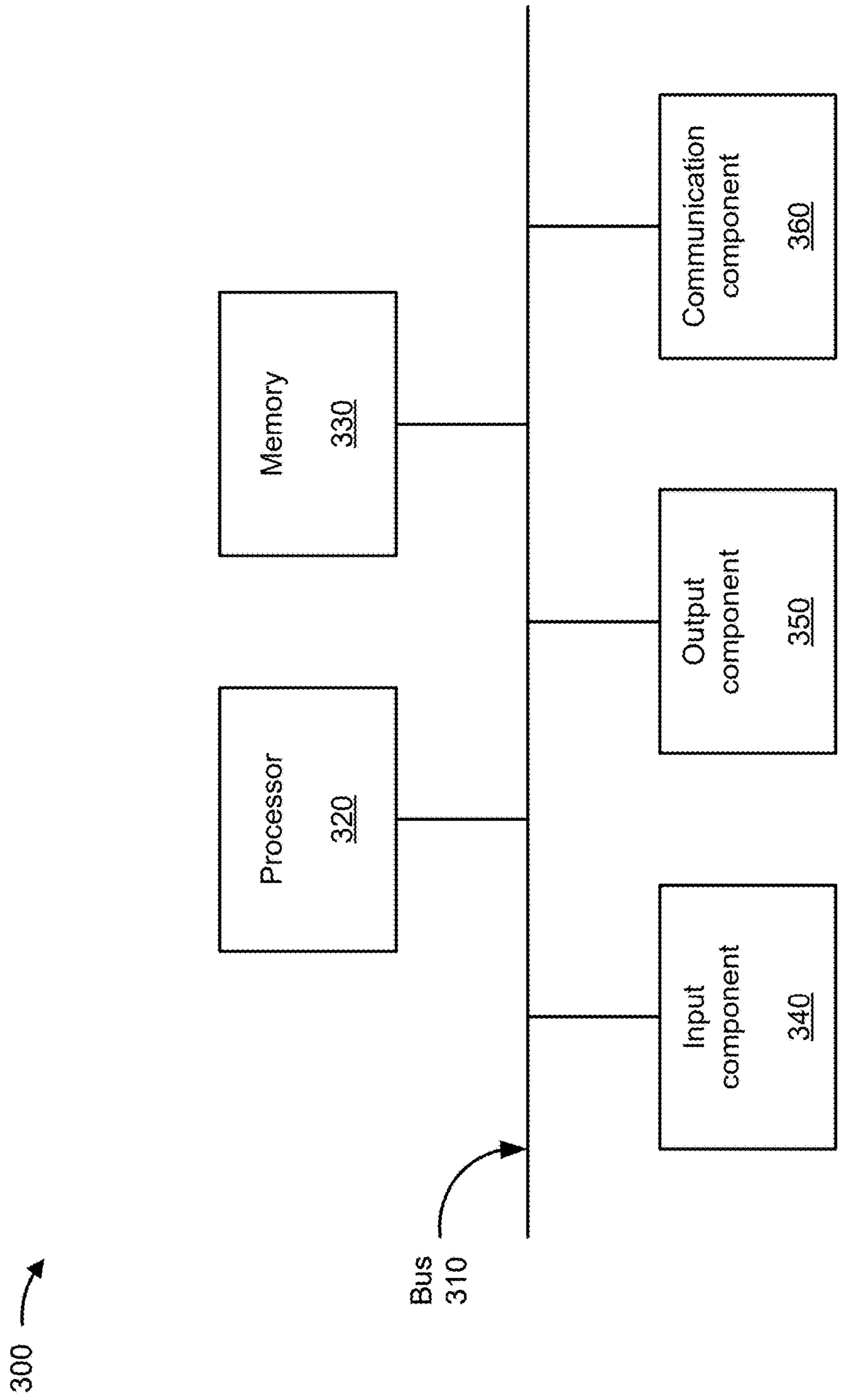
FIG. 3 is a diagram of example components of one or more devices of FIG. 2.

FIG. 3 is a diagram of example components of a device 300, which may correspond to the user device 105, the management system 110, and/or the data structure 115. In some implementations, the user device 105, the management system 110, and/or the data structure 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
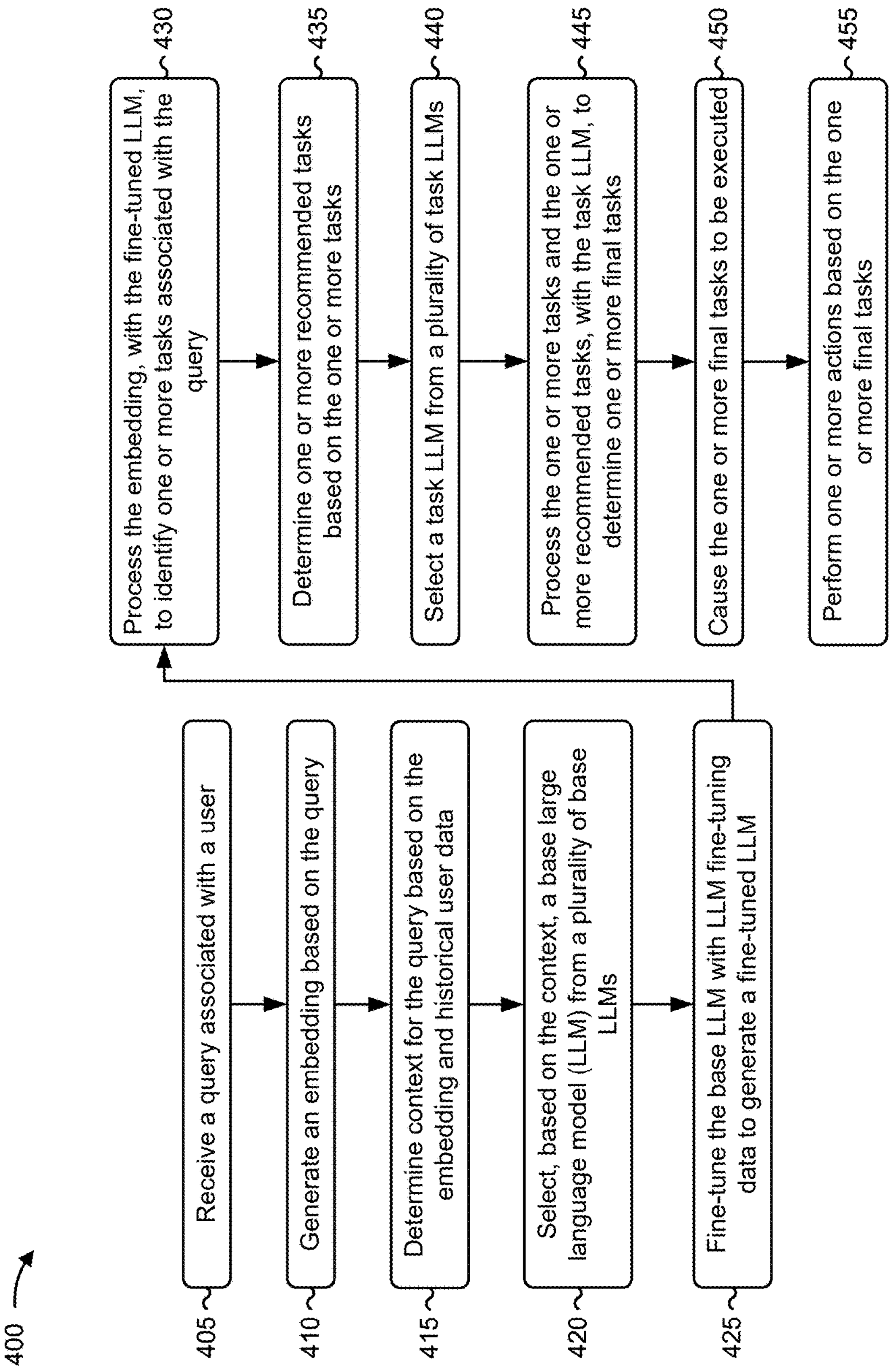
FIG. 4 is a flowchart of an example process for providing LLM-based device and network management and automation.

FIG. 4 is a flowchart of an example process 400 for providing LLM-based device and network management and automation. In some implementations, one or more process blocks of FIG. 4 may be performed by a device (e.g., the management system 110). In some implementations, one or more process blocks of FIG. 4 may be performed by another device or a group of devices separate from or including the device, such as a user device (e.g., the user device 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a query associated with a user (block 405). For example, the device may receive a query associated with a user, as described above. In some implementations, the query is associated with managing a network.

As further shown in FIG. 4, process 400 may include generating an embedding based on the query (block 410). For example, the device may generate an embedding based on the query, as described above.

As further shown in FIG. 4, process 400 may include determining context for the query based on the embedding and historical data (block 415). For example, the device may determine context for the query based on the embedding and historical data, as described above. In some implementations, the historical data includes data identifying one or more of a type associated with the user or historical interactions of the user with the device.

As further shown in FIG. 4, process 400 may include selecting, based on the context, a base LLM from a plurality of base LLMs (block 420). For example, the device may select, based on the context, a base LLM from a plurality of base LLMs, as described above. In some implementations, selecting, based on the context, the base LLM from the plurality of base LLMs includes determining a question to be answered for the query as the context, identifying one of the plurality of base LLMs that can answer the question to be answered for the query, and selecting the one of the plurality of base LLMs as the base LLM.

As further shown in FIG. 4, process 400 may include fine-tuning, by the device, the base LLM with LLM fine-tuning data to generate a fine-tuned LLM (block 425). For example, the device may fine-tune, by the device, the base LLM with LLM fine-tuning data to generate a fine-tuned LLM, as described above. In some implementations, fine-tuning the base LLM with the LLM fine-tuning data to generate the fine-tuned LLM includes determining whether the base LLM is capable of providing a response to the query, and fine-tune the base LLM with the LLM fine-tuning data to generate the fine-tuned LLM based on determining that the base LLM is incapable of providing the response to the query.

As further shown in FIG. 4, process 400 may include processing the embedding, with the fine-tuned LLM, to identify one or more tasks associated with the query (block 430). For example, the device may process the embedding, with the fine-tuned LLM, to identify one or more tasks associated with the query, as described above.

As further shown in FIG. 4, process 400 may include determining one or more recommended tasks based on the one or more tasks (block 435). For example, the device may determine one or more recommended tasks based on the one or more tasks, as described above. In some implementations, the one or more recommended tasks include one or more of a recommended new query or a recommended response to the new query.

As further shown in FIG. 4, process 400 may include selecting a task LLM from a plurality of task LLMs (block 440). For example, the device may select a task LLM from a plurality of task LLMs, as described above.

As further shown in FIG. 4, process 400 may include processing the one or more tasks and the one or more recommended tasks, with the task LLM, to determine one or more final tasks (block 445). For example, the device may process the one or more tasks and the one or more recommended tasks, with the task LLM, to determine one or more final tasks, as described above. In some implementations, the one or more final tasks include task instructions to be executed.

As further shown in FIG. 4, process 400 may include causing the one or more final tasks to be executed (block 450). For example, the device may cause the one or more final tasks to be executed, as described above. In some implementations, causing the one or more final tasks to be executed includes one of automatically executing the one or more final tasks, or instructing the user to execute the one or more final tasks.

As further shown in FIG. 4, process 400 may include performing one or more actions based on the one or more final tasks (block 455). For example, the device may perform one or more actions based on the one or more final tasks, as described above. In some implementations, performing the one or more actions includes generating a report based on execution of the one or more final tasks, and storing the report in a data structure with the historical data and the LLM fine-tuning data. In some implementations, performing the one or more actions includes generating a report based on execution of the one or more final tasks, and providing the report for display to the user or to one or more other users. In some implementations, performing the one or more actions includes one or more of retuning the fine-tuned LLM and the task LLM based on the one or more final tasks, or retraining the fine-tuned LLM and the task LLM based on the one or more final tasks.

In some implementations, process 400 includes receiving the historical data and the LLM fine-tuning data from a data structure. In some implementations, process 400 includes analyzing user interactions with the one or more final tasks to generate feedback data, fine-tuning the task LLM with the feedback data to generate a fine-tuned task LLM, and storing the fine-tuned task LLM.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, a query;

generating, by the device, an embedding based on the query;

determining, by the device, context for the query based on the embedding and historical data;

selecting, by the device and based on the context, a base large language model (LLM) from a plurality of base LLMs;

fine-tuning, by the device, the base LLM with LLM fine-tuning data to generate a fine-tuned LLM;

processing, by the device, the embedding, with the fine-tuned LLM, to identify one or more tasks associated with the query;

analyzing, by the device, the one or more tasks;

determining, by the device, one or more recommended tasks based on the analyzing;

selecting, by the device, a task LLM from a plurality of task LLMs;

processing, by the device, the one or more tasks and the one or more recommended tasks, with the task LLM, to determine one or more final tasks;

causing, by the device, the one or more final tasks to be executed; and performing, by the device, one or more actions based on the one or more final tasks.

2. The method of claim 1, further comprising:

receiving the historical data and the LLM fine-tuning data from a data structure.

3. The method of claim 1, further comprising:

analyzing user interactions with the one or more final tasks to generate feedback data;

fine-tuning the task LLM with the feedback data to generate a fine-tuned task LLM; and storing the fine-tuned task LLM.

4. The method of claim 1, wherein selecting, based on the context, the base LLM from the plurality of base LLMs comprises:

determining a question to be answered for the query as the context;

identifying one of the plurality of base LLMs that can answer the question to be answered for the query; and selecting the one of the plurality of base LLMs as the base LLM.

5. The method of claim 1, wherein the historical data includes data identifying one or more of a type associated with a user or historical interactions of the user with the device.

6. The method of claim 1, wherein the one or more final tasks include task instructions to be executed.

7. The method of claim 1, wherein causing the one or more final tasks to be executed comprises one of:

automatically executing the one or more final tasks; or instructing a user to execute the one or more final tasks.

8. A device, comprising:

one or more processors configured to:

receive a query;

generate an embedding based on the query;

determine context for the query based on the embedding and historical data;

select, based on the context, a base large language model (LLM) from a plurality of base LLMs;

fine-tune the base LLM with LLM fine-tuning data to generate a fine-tuned LLM;

process the embedding, with the fine-tuned LLM, to identify one or more tasks associated with the query;

analyze the one or more tasks;

determine one or more recommended tasks based on the analyzing;

select a task LLM from a plurality of task LLMs;

process the one or more tasks and the one or more recommended tasks, with the task LLM, to determine one or more final tasks;

analyze user interactions with the one or more final tasks to generate feedback data;

fine-tune the task LLM with the feedback data to generate a fine-tuned task LLM;

store the fine-tuned task LLM;

cause the one or more final tasks to be executed; and perform one or more actions based on the one or more final tasks.

9. The device of claim 8, wherein the one or more recommended tasks include one or more of a recommended new query or a recommended response to the new query.

10. The device of claim 8, wherein the one or more processors, to fine-tune the base LLM with the LLM fine-tuning data to generate the fine-tuned LLM, are configured to:

determine whether the base LLM is capable of providing a response to the query; and fine-tune the base LLM with the LLM fine-tuning data to generate the fine-tuned LLM based on determining that the base LLM is incapable of providing the response to the query.

11. The device of claim 8, wherein the query is associated with managing a network.

12. The device of claim 8, wherein the one or more processors, to perform the one or more actions, are configured to:

generate a report based on execution of the one or more final tasks; and store the report in a data structure with the historical data and the LLM fine-tuning data.

13. The device of claim 8, wherein the one or more processors, to perform the one or more actions, are configured to:

generate a report based on execution of the one or more final tasks; and provide the report for display to a user or to one or more other users.

14. The device of claim 8, wherein the one or more processors, to perform the one or more actions, are configured to one or more of:

retune the fine-tuned LLM and the task LLM based on the one or more final tasks; or retrain the fine-tuned LLM and the task LLM based on the one or more final tasks.

15. A non-transitory computer-readable medium storing a set of instructions, the set of instructions comprising:

one or more instructions that, when executed by one or more processors of a device, cause the device to:

receive a query associated with a user;

generate an embedding based on the query;

determine context for the query based on the embedding and historical data;

select, based on the context, a base large language model (LLM) from a plurality of base LLMs;

determine whether the base LLM is capable of providing a response to the query;

fine-tune the base LLM with LLM fine-tuning data to generate a fine-tuned LLM based on determining that the base LLM is incapable of providing the response to the query;

process the embedding, with the fine-tuned LLM, to identify one or more tasks associated with the query;

analyze the one or more tasks;

determine one or more recommended tasks based on the analyzing;

select a task LLM from a plurality of task LLMs;

process the one or more tasks and the one or more recommended tasks, with the task LLM, to determine one or more final tasks;

cause the one or more final tasks to be executed;

generate a report based on execution of the one or more final tasks; and perform one or more actions based on the report.

16. The non-transitory computer-readable medium of claim 15, wherein the one or more instructions further cause the device to:

analyze user interactions with the one or more final tasks to generate feedback data;

fine-tune the task LLM with the feedback data to generate a fine-tuned task LLM; and store the fine-tuned task LLM.

17. The non-transitory computer-readable medium of claim 15, wherein the one or more instructions, that cause the device to select, based on the context, the base LLM from the plurality of base LLMs, cause the device to:

determine a question to be answered for the query as the context;

identify one of the plurality of base LLMs that can answer the question to be answered for the query; and select the one of the plurality of base LLMs as the base LLM.

18. The non-transitory computer-readable medium of claim 15, wherein the one or more instructions, that cause the device to cause the one or more final tasks to be executed, cause the device to one of:

automatically execute the one or more final tasks; or instruct a user to execute the one or more final tasks.

19. The non-transitory computer-readable medium of claim 15, wherein the one or more recommended tasks include one or more of a recommended new query or a recommended response to the new query.

20. The non-transitory computer-readable medium of claim 15, wherein the one or more instructions, that cause the device to perform the one or more actions, cause the device to one or more of:

generate a report based on execution of the one or more final tasks; and provide the report for display to a user or to one or more other users.

* * * * *